(12) United States Patent
Corrain et al.

(10) Patent No.: US 10,048,120 B2
(45) Date of Patent: Aug. 14, 2018

(54) LASER SCANNER AND OPTICAL SYSTEM

(71) Applicant: Datalogic IP Tech, S.r.l., Bologna (IT)

(72) Inventors: Gabriele Corrain, Bologna (IT);
Giacomo Rigoni, Bologna (IT); Paolo Aprile, Bologna (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 14 days.

(21) Appl. No.: 15/145,532

(22) Filed: May 3, 2016

(65) Prior Publication Data

US 2017/0322074 A1 Nov. 9, 2017

(51) Int. Cl.
*H01J 40/14* (2006.01)
*G01J 1/04* (2006.01)
*G01J 1/44* (2006.01)
*G01S 7/481* (2006.01)

(52) U.S. Cl.
CPC ........... *G01J 1/0414* (2013.01); *G01J 1/0488* (2013.01); *G01J 1/44* (2013.01); *G01S 7/4817* (2013.01)

(58) Field of Classification Search
CPC ...... G01J 1/0403; G01J 1/0414; G01J 1/0488; G01S 7/4812; G01S 7/4817
USPC .................................................. 250/221, 234
See application file for complete search history.

(56) References Cited

U.S. PATENT DOCUMENTS

| 4,687,282 | A | 8/1987 | Ferrante |
| 5,202,784 | A | 4/1993 | Reddersen |
| 5,337,189 | A | 8/1994 | Krawczyk et al. |
| 5,455,669 | A | 10/1995 | Wetteborn |
| 6,491,222 | B1 | 12/2002 | Dvorkis et al. |
| 7,280,211 | B2 | 10/2007 | Horibe et al. |

(Continued)

FOREIGN PATENT DOCUMENTS

| CN | 101916357 A | 12/2010 |
| CN | 106324582 A | 1/2017 |

(Continued)

OTHER PUBLICATIONS

Corrain et al., "Laser Scanner and Optical System," U.S. Appl. No. 15/145,532, filed May 3, 2016, 47 pages.

(Continued)

*Primary Examiner* — Kevin Pyo
(74) *Attorney, Agent, or Firm* — Seed IP Law Group LLP

(57) ABSTRACT

A laser scanner which includes a transmission subsystem and a reception subsystem. The transmission subsystem includes a light source which emits a light beam and a scanning mirror rotatable about an axis which reflects the light beam toward a scanning area and which directs return light from objects toward the reception subsystem. The reception system may include a collecting mirror dimensioned and positioned to receive the return light from the scanning mirror. The reception system may also include a dichroic or interference filter disposed between the collecting mirror and the scanning mirror. The interference filter filters the return light from the scanning mirror and provides the filtered return light to the collecting mirror. The reception subsystem also includes a light detector disposed between the interference filter and the collecting mirror, in operation the light detector receives the filtered return light reflected from the collecting mirror.

36 Claims, 16 Drawing Sheets

(56) References Cited

U.S. PATENT DOCUMENTS

| | | |
|---|---|---|
| 7,880,865 B2 | 2/2011 | Tanaka et al. |
| 7,965,384 B2 | 6/2011 | Drinkard |
| 8,319,171 B2 | 11/2012 | Kawabata |
| 8,330,095 B2 | 12/2012 | Kawabata |
| 8,625,080 B2 | 1/2014 | Heizmann et al. |
| 8,724,096 B2 | 5/2014 | Gosch et al. |
| 8,902,409 B2 | 12/2014 | Sigmund et al. |
| 9,316,724 B2 * | 4/2016 | Gehring ............... G01S 7/4812 |
| 2002/0143506 A1 | 10/2002 | D'Aligny et al. |
| 2005/0205755 A1 | 9/2005 | Walsh et al. |
| 2008/0316310 A1 | 12/2008 | Braune et al. |
| 2009/0002678 A1 | 1/2009 | Tanaka et al. |
| 2009/0086189 A1 | 4/2009 | Drinkard |
| 2010/0198365 A1 | 8/2010 | Kawabata et al. |
| 2011/0077814 A1 | 3/2011 | Haberer |
| 2012/0026466 A1 | 2/2012 | Zhou et al. |
| 2013/0003041 A1 | 1/2013 | Sigmund et al. |
| 2013/0250302 A1 | 9/2013 | Kramer |
| 2013/0256418 A1 * | 10/2013 | Havens ............... G06K 7/10831 |
| | | 235/462.33 |
| 2014/0166866 A1 | 6/2014 | Gehring et al. |

FOREIGN PATENT DOCUMENTS

| | | |
|---|---|---|
| DE | 103 26 848 A1 | 1/2005 |
| DE | 20 2009 015 194 U1 | 3/2010 |
| DE | 10 2012 102 244 A1 | 10/2012 |
| DE | 10 2012 112 987 B3 | 12/2013 |
| DE | 20 2013 101 807 U1 | 7/2014 |
| EP | 1 562 055 A2 | 8/2005 |
| EP | 1 617 205 A1 | 1/2006 |
| EP | 1 617 206 A1 | 1/2006 |
| EP | 1 666 913 A2 | 6/2006 |
| EP | 1 965 225 A2 | 9/2008 |
| EP | 2 237 063 A1 | 10/2010 |
| EP | 2 375 264 B1 | 5/2012 |
| EP | 2 447 733 A1 | 5/2012 |
| EP | 2 378 309 B1 | 7/2012 |
| EP | 2 541 273 B1 | 5/2013 |
| EP | 2 624 016 A1 | 8/2013 |
| EP | 2 950 115 A1 | 12/2015 |
| EP | 3 267 218 A1 | 1/2018 |
| JP | 62-254008 A | 11/1987 |
| WO | 97/22945 A1 | 6/1997 |
| WO | 03/087875 A1 | 10/2003 |

OTHER PUBLICATIONS

Elmer, "The Optical Design of Reflectors." New York, NY, John Wiley & Sons, 1980, pp. 72-75.

Faetani et al., "Clutter Filter Configuration for Safety Laser Scanner," U.S. Appl. No. 15/203,531, filed Jul. 6, 2016, 38 pages.

Lorenzoni et al., "Laser Scanner With Reduced Internal Optical Reflection," U.S. Appl. No. 15/145,545, file May 3, 2016, 30 pages.

Omron Corporation, "Safety Laser Scanner OS32C Series—User's Manual," Manual No. Z296-E1-10, Mar. 2015, 179 pages.

Rigoni, "Laser scanner and related receiving optical system," Datalogic Invention Disclosure Form, Jan. 14, 2016, 15 pages.

SICK Sensor Intelligence, "microScan3—The New Generation of Safety Laser Scanners," Feb. 29, 2016, 28 pages.

SICK Sensor Intelligence, "Safety Designer—Configuration software—Installation and operation," Feb. 5, 2016, 32 pages.

Zhao, "Practical Reflector Design and Calculation for General Illumination," *Proceedings of SPIE 5942, Nonimaging Optics and Efficient Illumination Systems II*, San Diego, CA, Jul. 31, 2005, 9 pages.

Extended European Search Report, dated Oct. 23, 2017, for European Application No. 17169257.7-1812, 6 pages.

International Search Report, dated Oct. 12, 2017, for International Application No. PCT/IT2017/000094, 12 pages.

Extended European Search Report, dated Aug. 25, 2017, for European Application No. 17169258.5-1812, 72 pages.

Office Action, dated Jul. 28, 2017, for U.S. Appl. No. 15/203,531, Faetani et al., "Clutter Filter Configuration for Safety Laser Scanner," 14 pages.

Extended European Search Report, dated Nov. 30, 2017, for European Application No. 17179849.9-1812, 8 pages.

* cited by examiner

LASER SCANNER AND OPTICAL SYSTEM

BACKGROUND

Technical Field

The present disclosure generally relates to optical sensors, and more particularly, to laser scanners and optical systems for laser scanners.

Description of the Related Art

Optical sensors are currently used in a number of applications for the detection of objects. One type of optical sensor is a laser scanner, in which a collimated light beam generated by a laser source periodically moves over an area to be scanned or monitored. The light beam may be moved by a scanning mirror or other deflection unit which rotates or oscillates to direct light beams over the area. Using the angular position of the scanning mirror, the angular position of an object may be determined. Using the time of flight for pulses of light reflected by an object and the speed of light, the distance of an object may also be determined. From the angular and distance measurements, objects may be detected in the area in two-dimensional polar coordinates, for example.

In addition to object measurement applications, laser scanners may also be used in safety applications for monitoring a source of danger, such as a machine. In such safety applications, a laser scanner may be positioned to monitor an area proximate the source of danger which should not be entered by personnel. If a person or object enters the monitored area when the laser scanner is active, the laser scanner may generate an alarm and/or mitigate the source of danger (e.g., cause shutdown of a running machine).

FIG. 1 shows a schematic sectional view of a laser scanner 10 described in U.S. Pat. Pub. No. 2013/0003041. In operation, a light source 12, such as a laser diode, emits a collimated beam 14 in the form of short (e.g., few nanoseconds) pulses toward a bending or folding mirror 16, which reflects the beam toward a scanning mirror 18, which directs the beam toward a scanning area 20. If an object is present in the scanning area 20, the diffuse light 22 that is back-reflected by the object is reflected by the scanning mirror 18, collected by a collecting lens 24 and detected by a light detector 26 (e.g., a photodiode).

A motor 28 may be operatively coupled to the scanning mirror 18 to drive the scanning mirror in continuous rotation about a vertical axis of rotation. The angular position of the scanning mirror 18 may be detected by an angular position detector 30, such as an encoder. The light beam 14 generated by the light source 12 therefore scans the scanning area 20 generated by the rotational movement. In instances where there is an object in the scanning area 20 and a reflected light signal is detected by the light detector 26, the angular position of the object in the scanning area may be derived from the angular position of the scanning mirror 18, as detected by the angular position detector 30.

The time of flight of individual laser light pulses from their transmission until the reception after reflection by the object in the scanning area 20 may be determined, which allows for calculation of the distance of the object from the laser scanner 10 based on the known speed of light. This evaluation may be performed by a controller 32 which is operatively coupled to the light source 12, the light detector 26, the motor 28, and/or the angular position detector 30.

The components of the laser scanner 10 may be arranged in a housing 34 which includes a protective window 36 in the area where light enters and leaves the laser scanner.

As shown in FIG. 1, the transmission path 38 and the reception path 22 are coaxial, which avoids a parallax offset at short distances. However, the transmission optical elements (e.g., bending mirror 16) provide a central obstruction in the reception path. Thus, for light reflected back from objects at a relatively far distance, the incoming beam 22 fills the sensitive area of the light detector 26 and the central obstruction causes a flux loss (e.g., 10% flux loss). For objects at a relatively short distance, however, the incoming beam on the plane of the light detector 26 will be defocused and the shadow of the central obstruction will be enlarged. Such shadow causes a strong reduction of the signal for objects near the laser scanner 10, which could cause the laser scanner to fail to detect objects at short ranges (e.g., less than 1 meter).

As shown in FIG. 2, to overcome this problem, a collecting lens 40 may be provided that is divided into two more sections or concentric rings, such as a marginal section 42 and a central section 44. For an object 46 which is relatively close to the laser scanner, the marginal rays 48 will not hit the light detector 26 and thus will not contribute to the measured signal. The central section 44 of the lens 40 has a shorter focal distance and will bend the rays 50 coming from the near range toward the light detector 26 to be detected thereby.

FIG. 3 shows a portion of an optical system 60 for a laser scanner which includes a light source 62 (e.g., laser diode) which directs a collimated beam 64 toward a folding mirror 66 which directs the beam to a scanning area 68. Input light 70 reflected from objects in the scanning area 68 may be collected by a collecting lens 72, which focuses the light onto a light detector 74 (e.g., a photodiode). An interference filter 76 may be positioned on top of (as shown) the light detector 74 to block light which is outside the wavelength band of the light source. The optical path length (OPL) is also shown in FIG. 2.

The interference filter 76 may have a transmission efficiency which is dependent on the incidence angle $A_1$. In some instances, due to the working f-number of the collecting lens being close to 1, the interference filter 76 typically must accept rays 78 with an incidence angle of up to 30 degrees. With such a relatively wide acceptance angle for the interference filter 76, the interference filter may be required to pass not only the rays from the reception path but also light which is scattered by unwanted reflections inside the housing of the laser scanner.

BRIEF SUMMARY

A laser scanner to detect objects in a scanning area may be summarized as including: a transmission subsystem and a reception subsystem, the transmission subsystem including: a light source which in operation emits a light beam; and a scanning mirror rotatable about an axis of rotation which reflects the light beam from the light source toward the scanning area and which directs return light from objects in the scanning area toward the reception subsystem; the reception subsystem, including: a collecting mirror dimensioned and positioned to receive the return light from the scanning mirror; an interference filter disposed between the collecting mirror and the scanning mirror, in operation the interference filter filters the return light from the scanning mirror and provides the filtered return light to the collecting mirror; and a light detector disposed between the interference filter and the collecting mirror, in operation the light detector receives the filtered return light reflected from the collecting mirror.

The collecting mirror may have a reflective surface which has an aspheric profile. The collecting mirror may have a reflective surface which is defined at least in part by an N degree polynomial, where N is an integer greater than or equal to three. The collecting mirror may have a reflective surface which is defined at least in part by a Zernike polynomial or a Chebyshev polynomial. The collecting mirror may have a reflective surface which has a continuous curvature. The collecting mirror may have a reflective surface which comprises at least one layer of a reflective coating disposed over a plastic material. The reflective coating of the collecting mirror may include at least one of an aluminum coating, a silver coating, or a gold coating, and the plastic material comprises at least one of polycarbonate (PC), polymethylmethacrylate (PMMA), or cyclic olefin polymer (COP). The plastic material may be absorptive to the light beam emitted by the light source. The light source may include a laser diode, and the light detector may include an avalanche photodiode. The interference filter may include a bandpass filter which filters light having wavelengths which are outside a spectrum of the light beam emitted by the light source. The interference filter may include a colored glass substrate.

The laser scanner may further include a first folding mirror disposed in an optical path between the light source and the scanning mirror.

The first folding mirror may have a reflective surface which is parallel with a reflective surface of the scanning mirror. The first folding mirror may have a reflective surface which is non-parallel with a reflective surface of the scanning mirror. The first folding mirror may reflect the light beam at an angle of reflection other than 45 degrees with respect to normal.

The laser scanner may further include a second folding mirror disposed in the optical path between the light source and the first folding mirror.

The first folding mirror and the second folding mirror may have respective reflective surfaces which are parallel to each other. At least one of the first folding mirror and the second folding mirror may have a reflective surface which is non-parallel with a reflective surface of the scanning mirror. At least one of the first folding mirror and the second folding mirror may reflect the light beam at an angle of reflection other than 45 degrees with respect to normal. The collecting mirror may include a compound mirror comprising a central mirror which has a reflective surface which has a parabolic profile or an elliptical profile, and an outer ring mirror which surrounds the central mirror, the outer ring mirror having a reflective surface which has an aspheric profile. An outer edge of the reflective surface of the central mirror may have a first tangent value, and an inner edge of the of the reflective surface of the outer ring mirror may have a second tangent value, the second tangent value equal to the first tangent value to provide continuous curvature between the reflective surface of the central mirror and the reflective surface of the outer ring mirror. The reflective surface of the outer ring mirror may be defined at least in part by an N degree polynomial, where N is an integer greater than or equal to three. The reflective surface of the outer ring mirror may be defined at least in part by a Zernike polynomial or a Chebyshev polynomial.

A method of operating a laser scanner to detect objects in a scanning area may be summarized as including: emitting, by a light source, a light beam; reflecting, by a scanning mirror rotatable about an axis of rotation, the light beam emitted by the light source toward the scanning area; reflecting, by the scanning mirror, return light reflected from objects in the scanning area toward an interference filter; filtering, by the interference filter, the return light from the scanning mirror to provide filtered return light; reflecting, by a collecting mirror, the filtered return light toward a light detector; and detecting, by the light detector, the filtered return light reflected from the collecting mirror.

Reflecting, by a collecting mirror, the filtered return light toward a light detector may include reflecting by a collecting mirror which has a reflective surface having an aspheric profile. Reflecting, by a collecting mirror, the filtered return light toward a light detector may include reflecting by a collecting mirror which has a reflective surface defined at least in part by a Zernike polynomial, a Chebyshev polynomial, or an N degree polynomial, where N is an integer greater than or equal to three.

The method of operating a laser scanner to detect objects in a scanning area may further include folding, by a first folding mirror disposed in an optical path between the light source and the scanning mirror, the light beam between the light source and the scanning mirror.

Folding the light beam between the light source and the scanning mirror may include folding the light beam by a first folding mirror which has a reflective surface which is parallel with a reflective surface of the scanning mirror. Folding the light beam between the light source and the scanning mirror may include folding the light beam by a first folding mirror which has a reflective surface which is non-parallel with a reflective surface of the scanning mirror. Folding the light beam between the light source and the scanning mirror may include folding the light beam by the first folding mirror by an angle of reflection which is less than 45 degrees.

The method of operating a laser scanner to detect objects in a scanning area may further include folding, by a second folding mirror disposed in the optical path between the light source and the first folding mirror, the light beam between the light source and the first folding mirror.

Folding the light beam between the light source and the scanning mirror by the first folding mirror and the second folding mirror may include at least one of: folding the light beam by the first folding mirror by an angle of reflection which is less than 45 degrees, and folding the light beam by the second folding mirror by an angle of reflection which is less than 45 degrees. Folding the light beam between the light source and the scanning mirror by the first folding mirror and the second folding mirror may include folding the light beam by the first folding mirror by an angle of reflection which is less than 45 degrees and folding the light beam by the second folding mirror by an angle of reflection which is less than 45 degrees. Reflecting, by a collecting mirror, the filtered return light toward a light detector may include reflecting by a collecting mirror which comprises a compound mirror including a central mirror which has a reflective surface which has a parabolic profile or an elliptical profile, and an outer ring mirror which surrounds the central mirror, the outer ring mirror having a reflective surface which has an aspheric profile. Reflecting, by a collecting mirror, the filtered return light toward a light detector may include reflecting by the compound mirror, and an outer edge of the reflective surface of the central mirror may have a first tangent value, and an inner edge of the of the reflective surface of the outer ring mirror may have a second tangent value, the second tangent value equal to the first tangent value to provide continuous curvature between the reflective surface of the central mirror and the reflective surface of the outer ring mirror. Reflecting, by a collecting mirror, the filtered return light toward a light detector may include reflecting by the compound mirror, and the reflective surface of the outer ring mirror may be defined at least in part by an N degree polynomial, where N is an integer greater than or equal to three. Reflecting, by a collecting mirror, the filtered return light toward a light detector may include reflecting by the compound mirror, and the reflective surface of the outer ring mirror may be defined at least in part by a Zernike polynomial or a Chebyshev polynomial.

An optical system for a laser scanner which detects objects in a scanning area may be summarized as including: a light source which in operation emits a laser beam; a scanning mirror rotatable about an axis of rotation which reflects the laser beam from the light source toward the scanning area and which reflects return light from objects in the scanning area; a collecting mirror dimensioned and positioned to receive the return light from the scanning mirror; an interference filter disposed between the collecting mirror and the scanning mirror; and a light detector disposed between the interference filter and the collecting mirror.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc.

Unless the context requires otherwise, throughout the specification and claims that follow, the word "comprising"

is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to laser scanners and optical systems for laser scanners which may be used in any number of applications, such as safety applications. The optical system of one or more implementations may include an emitting or transmission subsystem which scans a scanning area using a laser beam. The optical system may also include a reception subsystem which detects light (visible or nonvisible, more generally "electromagnetic radiation") scattered back by an object positioned inside the scanning area. Compared to existing systems and methods, one or more of the implementations discussed herein provide relatively better performance and/or allow for relatively reduced dimensions.

Figure 4A:
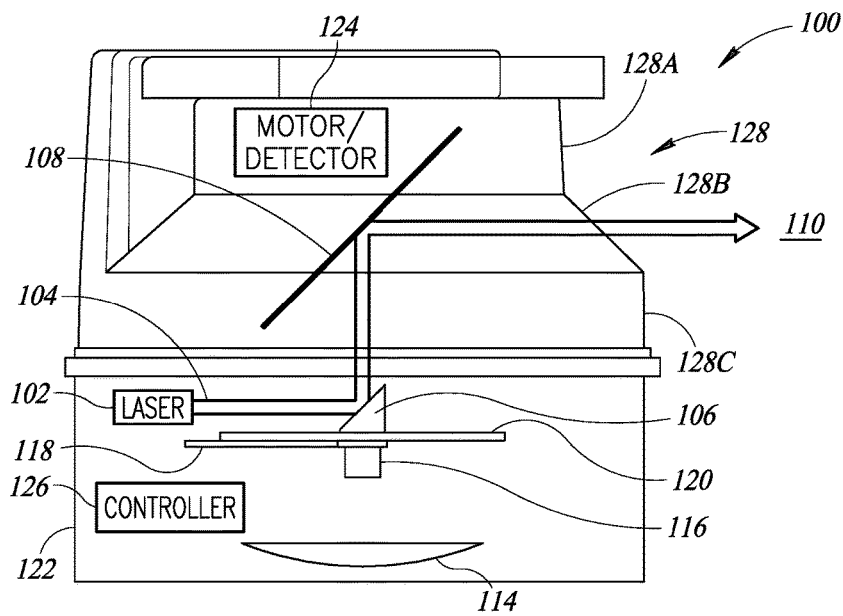
FIG. 4A is a schematic sectional view of a laser scanner showing a transmission period of the laser scanner, according to one illustrated implementation.
Figure 4B:
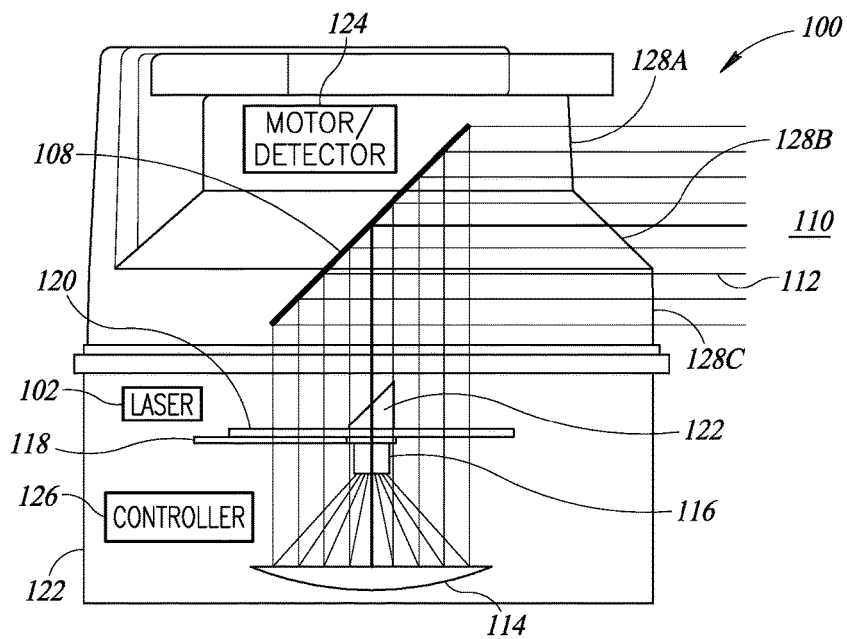
FIG. 4B is a schematic sectional view of the laser scanner of FIG. 4A showing a reception period of the laser scanner, according to one illustrated implementation.
Figure 5:
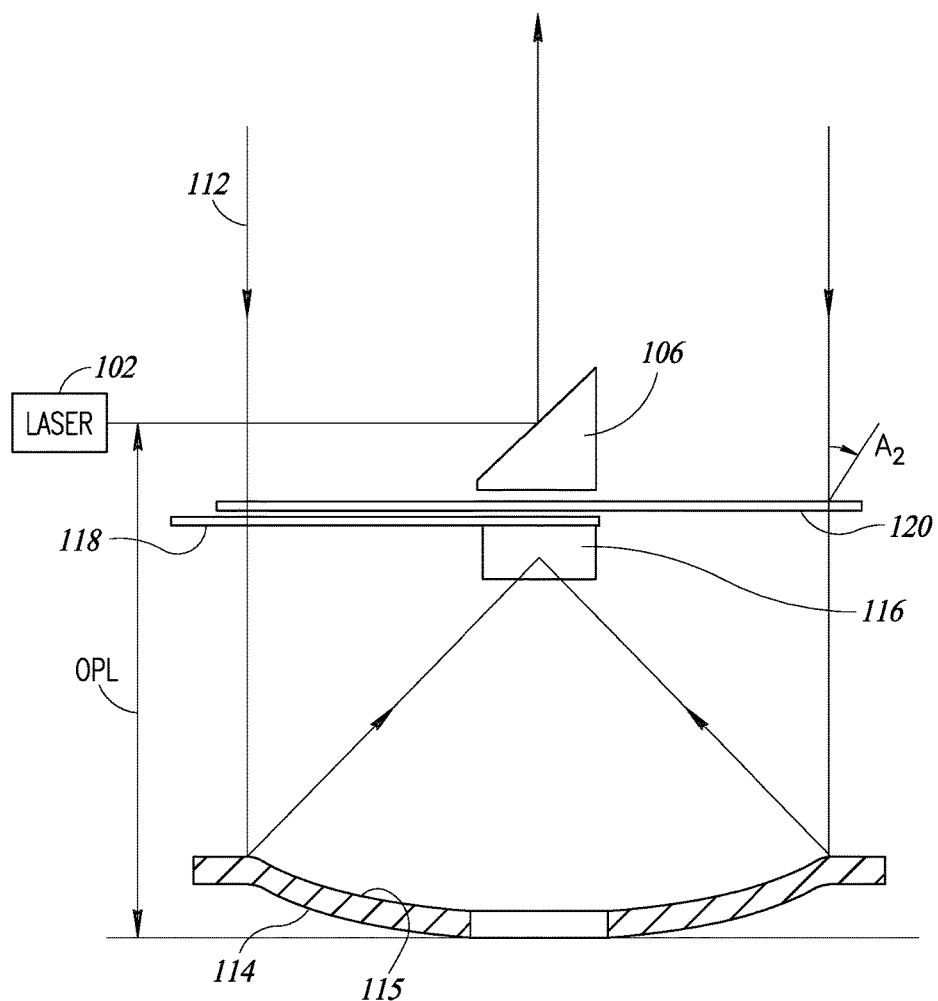
FIG. 5 is a schematic sectional view of a portion of an optical system for the laser scanner of FIG. 4A, according to one illustrated implementation.

Referring to FIGS. 4A, 4B and 5, a laser scanner 100 is shown, according to one illustrated implementation. As shown in FIG. 4A, the laser scanner 100 includes a light source or emitter 102, such as a laser diode, that emits a collimated beam 104 in the form of short (e.g., few nanoseconds) pulses toward a bending or folding mirror 106, which reflects the beam toward a scanning mirror 108. The light source 102 may have an emission band in the near infrared (NIR) range and may have a peak wavelength of 905 nanometers, for example. The scanning mirror 108 directs the beam toward a scanning area 110.

As shown in FIG. 4B, if an object is present in the scanning area 110, diffuse light 112 that is back-reflected by the object is reflected by the scanning mirror 108, and directed downward toward collecting optics which include a concave collecting reflector or mirror 114. The collecting mirror 114 is positioned below the folding mirror 106 to direct and focus light from the scanning mirror 108 which has been reflected from one or more objects positioned within the scanning area 110 toward a light detector 116 (e.g., avalanche photodiode, other photodetector) which is supported by a support arm 118.

The collecting mirror 114 may be formed of a plastic material (e.g., polycarbonate (PC), polymethylmethacrylate (PMMA), cyclic olefin polymer (COP)) which has a one or more layers of a reflective coating thereon to provide a reflective surface 115 (FIG. 5). The reflective coating may include a metal layer such as aluminum or gold, optionally with a protective layer of a transparent material (e.g., $SiO_2$). Another example of a reflective coating is a dielectric multilayer coating that has a very high (e.g., 99%) reflectivity for a specific wavelength band. The collecting mirror 114 may be formed from a material with low water absorption properties which may reduce the likelihood that a reflective coating will peel off during the lifetime of the laser scanner 100. In some implementations, the collecting mirror 114 is opaque to wavelengths of light emitted by the light source 102 so that the small fraction of light which passes through the reflective surface 115 is absorbed by the material and is not diffused inside a housing 122 of the laser scanner 100.

The laser scanner 100 also includes a dichroic or interference filter 120 positioned above (as shown) the light detector 116 to filter the returned light 112 from the scanning mirror 108 before the returned light reaches the collecting mirror 114. The interference filter 120 transmits spectral bands which correspond to the light emitted by the light source 102 and reflects spectral bands outside of the spectral band emitted by the light source. Since the interference filter 120 is placed in the optical path before the collecting mirror 114, the interference filter may be designed to accept rays with an relatively small incidence angle $A_2$ (FIG. 5), such as an incidence angle of only a few degrees (e.g., 3 degrees, 5 degrees, 10 degrees, 20 degrees). By allowing the acceptance angle of the interference filter 120 to be relatively small, the interference filter may more effectively filter the scattered light from within the housing 122 of the laser scanner 100, thereby improving the signal to noise ratio.

In some implementations, the interference filter 120 is made with a colored class filter substrate having a single or multilayer coating on one or both sides thereof. The glass material may be, for example, Schott RG830 glass offered by Schott Corporation or Hoya IR-83 glass offered by Hoya Corporation. The interference filter 120 may in some implementations have a black appearance because the glass material may not be transparent to visible light but has a relatively high transmittance (e.g., greater than 90%) in the NIR region emitted by the light source 102. Additional layer(s) may be operative to filter wavelengths of light beyond the emission band of the light source 102. The collecting mirror 114 and interference filter 120 are discussed in further detail below.

The laser scanner 100 may also include a motor/detector 124 which is operatively coupled to the scanning mirror 108 to drive the scanning mirror in continuous rotation about a vertical axis of rotation. For example, in some implementations the scanning mirror 108 may rotate at an approximate speed of 2000 rotations per minute. The angular position of the scanning mirror 108 may be detected by the motor/detector 124, which may include an angular position detector such as an encoder. The light beam 104 generated by the light source 102 in the form of short pulses therefore scans the scanning area 110 generated by the rotational movement. In instances where there is an object in the scanning area 110 and a reflected light signal is detected by the light detector 116, the angular position of the object in the scanning area 110 may be derived from the angular position of the scanning mirror 108, as detected by the motor/detector 124.

The time of flight of individual laser light pulses from their transmission until the reception after reflection on the object in the scanning area 110 may be determined, which allows for calculation of the distance of the object from the laser scanner 100 based on the known speed of light. This evaluation may be performed by a controller 126 which is operatively coupled to the light source 102, the light detector 116, and/or the motor/detector 124.

The controller 126 may be any suitable controller, and may include one or more central processing units (CPUs), microprocessors, digital signal processors (DSPs), application-specific integrated circuits (ASICs), field programmable gate arrays (FPGAs), programmable logic controllers (PLCs), etc. The controller 126 may include or be operatively coupled to nontransitory processor-readable storage media (e.g., RAM, ROM, flash), input/output systems, wired/wireless communication systems, etc., as is known in the art.

The components of the laser scanner 100 may be arranged in the housing 122 which includes a protective window 128 in the area where light enters and leaves the laser scanner. The protective window 128 may be made of a plastic material (e.g., polycarbonate, other polymer material) which has a high transmittance of light for wavelengths which are emitted by the light source 102. In some implementations, the visual appearance of the window 128 may be black, which filters visible light and which hides the internal components of the laser scanner 100. The window 128 may have rotation symmetry about the vertical axis of rotation of the scanning mirror 108.

In some implementations, the protective window 128 has a profile which is divided into an upper section 128A, a middle section 128B, and a lower section 128C. The middle section 128B of the protective window 128 may be tilted with a relatively large angle (e.g., 30 degrees, 45 degrees) with respect to the vertical axis, which provides at least two benefits. First, for at least some coating processes the inner and outer surface of the window 128 can be effectively coated with an anti-reflective coating only if the tilt of the window is above a certain angle (e.g., more than 30 degrees). This is because the dielectric material in the vacuum deposition process comes from a direction which is parallel to the vertical symmetry axis and cannot substantially stack on vertical or nearly vertical surfaces. Second, by providing the tilted middle section 128B of the protective window 128, the small fraction of light transmitted from the light source 102 which undergoes specular reflection is directed downward away from the optical path of the receiving subsystem and can be stopped by a light absorbing material positioned within the housing 122 of the laser scanner 100.

Figure 3:
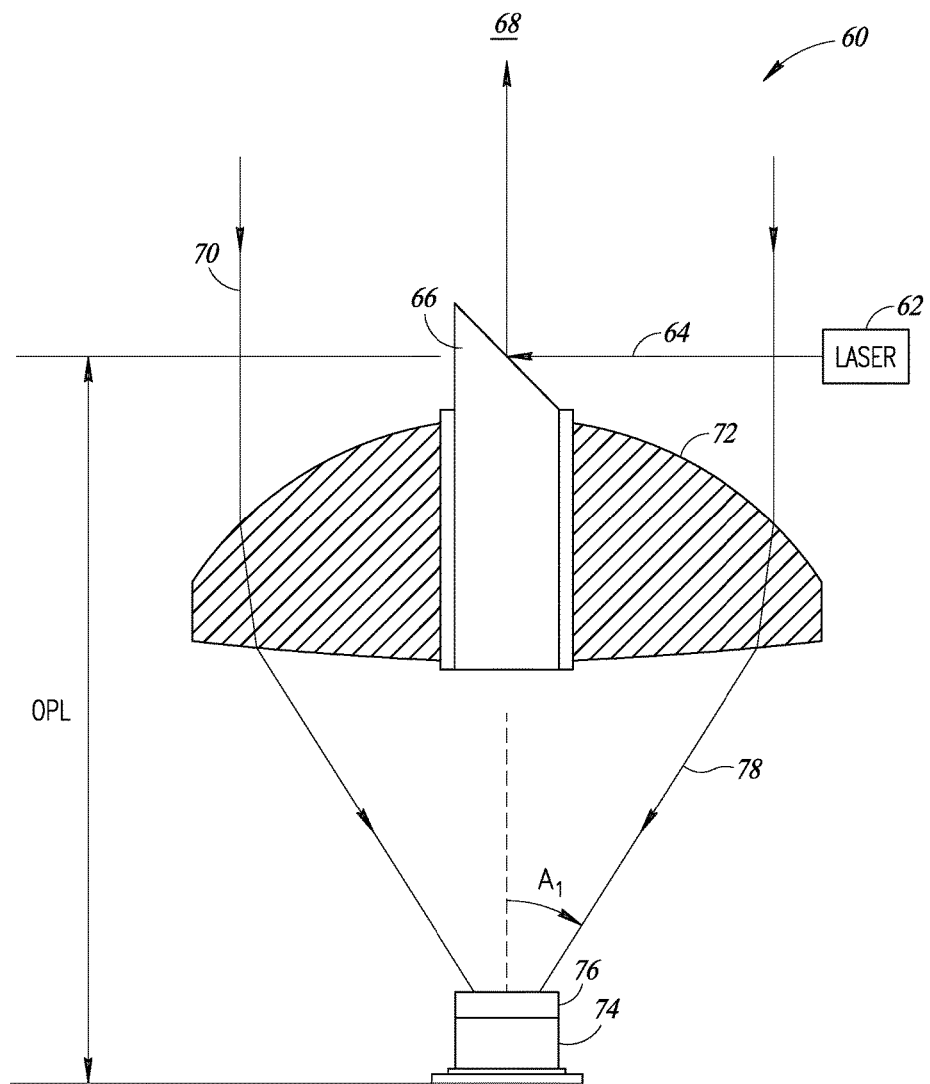
FIG. 3 is a schematic sectional view of a portion of an optical system for a laser scanner, such as the laser scanner of FIG. 1.

By utilizing the collecting reflector 114 rather than a lens for the concentrator optics, several limitations of conventional collecting lenses may be mitigated. For example, the large numerical aperture requirements typically result in a relatively thick lens with a short radius of curvature. In such instances, the irradiance distribution spot at the focus point of the lens may be strongly affected by inhomogeneities in the lens material. Such is an issue when the lens is made of glass, and may be worse in cases where the lens is made from a plastic material. Additionally, due to the relatively large thickness of the lens, the birefringence of the lens material may introduce aberrations in the spot image at the focal plane of the lens. The thickness of the lens also increases the length of the optical system, which results in a larger housing requirement for the laser scanner. As shown in FIG. 5, the optical path length (OPL) of the optical system of the laser scanner 100 may be substantially shorter than the OPL of a system which utilizes a thick lens (see FIG. 3). Further, the index of refraction of a lens is temperature dependent and, in combination with the thermal expansion of the lens material, the focus position of the lens will shift due to variations in temperature.

Utilizing the reflector 114 as the collecting optics for the laser scanner 100 rather than a thick lens has further advantages. For example, the reflector 114 may have a relatively thin profile compared to a lens, due to the smaller thickness and larger radius of curvature of the reflector. Additionally, shapes having a larger radius of curvature are easier to mold with a given precision. Additionally, by using a reflector, the focus configuration is independent of the refractive index of the material which, as noted above, may change due to changes in environmental conditions. Further, when using a reflector the quality of the spot on the plane of the light detector 116 is not affected by material inhomogeneities, internal stresses, bubbles and birefringence. Moreover, a reflector may be made of only one optical surface and the mold for the reflector may only require one optical mold insert, compared to two optical mold inserts required for using a lens for the collecting optics.

Additionally, in some instances, a reflector with a reflective coating (e.g., aluminum coating, silver coating, gold coating) may have a higher flux transfer efficiency than a lens, even when the lens has an anti-reflective coating on both sides thereof. Advantageously, during manufacturing a reflective surface may be coated with a layer of material by a single coating process, whereas an effective anti-reflective coating on a lens may require multiple coating processes (e.g., application of multiple coating layers on one or both sides of a lens).

Figure 6:
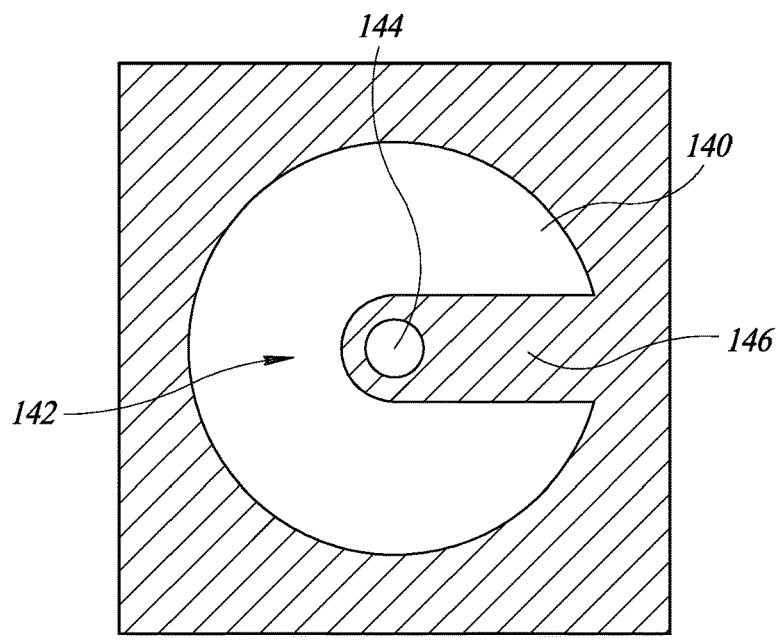
FIG. 6 is a schematic diagram showing the shape of a clear aperture of a reception subsystem for a laser scanner, according to one illustrated implementation.

FIG. 6 is a schematic diagram showing the shape of a clear aperture 140 of a reception subsystem for the laser scanner 100. As shown, the clear aperture 140 is "C" shaped due to a central obstruction 142 caused by the light detector 116 and its support arm 118. In FIG. 6 the portion of the central obstruction 142 caused by the light detector 116 is identified by reference numeral 144 and the portion of the central obstruction caused by the support arm 118 is identified by reference numeral 146.

Figure 7A:
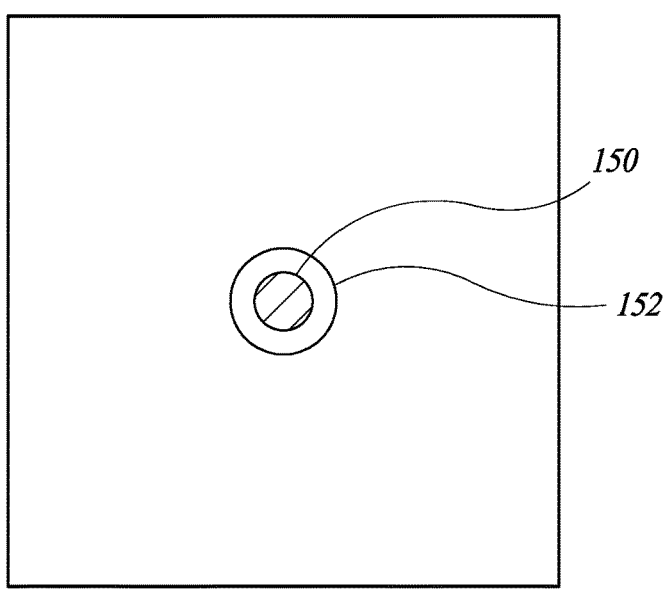
FIG. 7A is a schematic diagram showing a focused image relative to a sensitive area of a light detector at a far-range distance, according to one illustrated implementation.
Figure 7B:
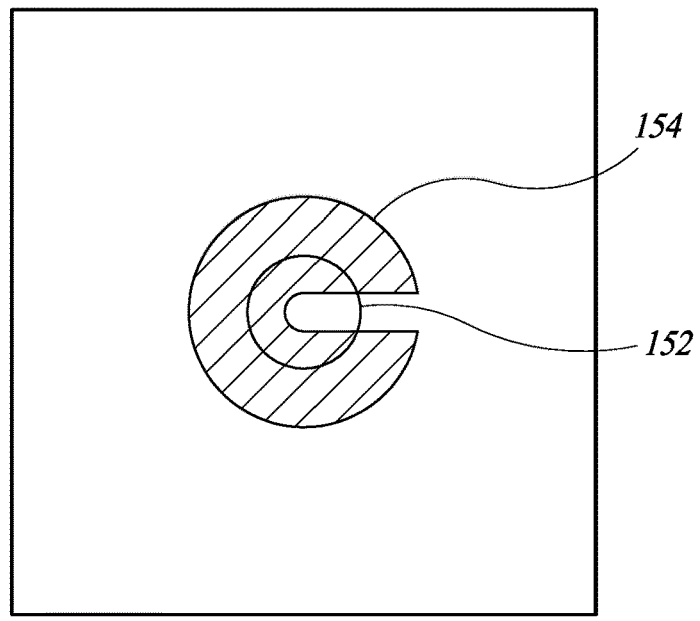
FIG. 7B is a schematic diagram showing a defocused image relative to a sensitive area of a light detector at a mid-range distance, according to one illustrated implementation.
Figure 7C:
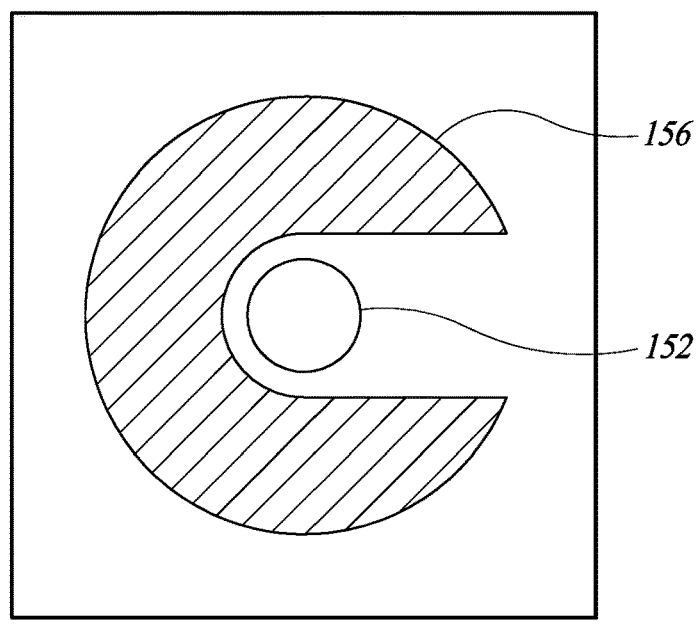
FIG. 7C is a schematic diagram showing a defocused image relative to a sensitive area of a light detector at a near-range distance, according to one illustrated implementation.

FIG. 7A is a schematic diagram showing a focused spot or image 150 relative to a sensitive area 152 of the light detector 116 at a relatively far-range distance. As shown, when an object is at a relatively far distance, the entrance profile pupil is not visible because the rays which make up the focused image 150 are focused on the sensitive area 152 of the light detector 116. As shown in FIG. 7B, when an object is at a mid-range distance, an image 154 is slightly defocused, which causes some of the image to appear outside of the sensitive area 152 of the light detector 116. As shown in FIG. 7C, when an object is closer than a minimum distance, a defocused image 156 is larger and surrounds the sensitive area 152 of the light detector 116, causing substantially no signal to be detected by the light detector. In the condition shown in FIG. 7C, the light detector 116 is "blind" and cannot detect objects which are closer than the minimum distance to the laser scanner 100.

If the collecting mirror has the shape of a simple parabolic profile, the blind zone shown in FIG. 7C for objects at short distances can extend out as far as 1 meter or more which, in many applications, may be unacceptable. For instance, in some applications, it may be desirable to detect objects at relatively short distances (e.g., 20 cm, 10 cm, 5 cm).

A fine-tuning of the "cut-off" detection distance may be implemented to set a balance between two opposing requirements: objects positioned at short distances should be detected, but the scattered light from the protective window 128 should not disturb the object detection. Even if the protective window 128 has clean and polished surfaces, a small amount of back scattering and the associated flux may be comparable or even higher than the signal from an object that is close to the device and has a low reflectance surface. Under such a condition, the object signal is blended with the scattered light from the protective window 128 and no detection may occur. Further, in practical application environments, dust particles and/or droplets may gather on the outer surface of the protective window 128, which increases the fraction of scattered light and potentially increases this problem.

To overcome these and other issues, in some implementations the collecting reflector 114 may have an aspheric surface profile which can successfully modulate the width and position of the blind zone shown in FIG. 7C. Such an aspheric profile may be described by a polynomial function having a degree N, where N is an integer greater than or equal to three, for example. As another example, the aspheric profile may be described by a Zernike polynomial or a Chebyshev polynomial. The cut-off distance is sensitive to profile of the collecting reflector and to the position and diameter of the obstruction.

Figure 1:
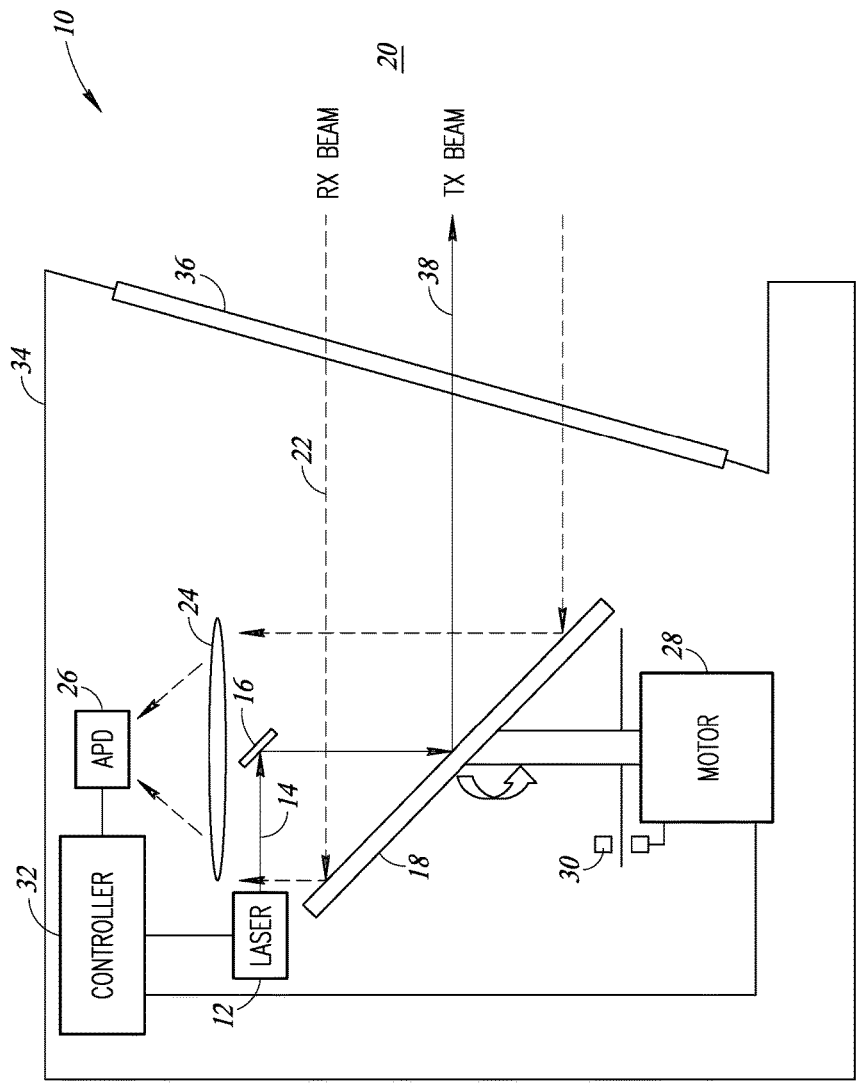
FIG. 1 is a schematic sectional view of a laser scanner.
Figure 2:
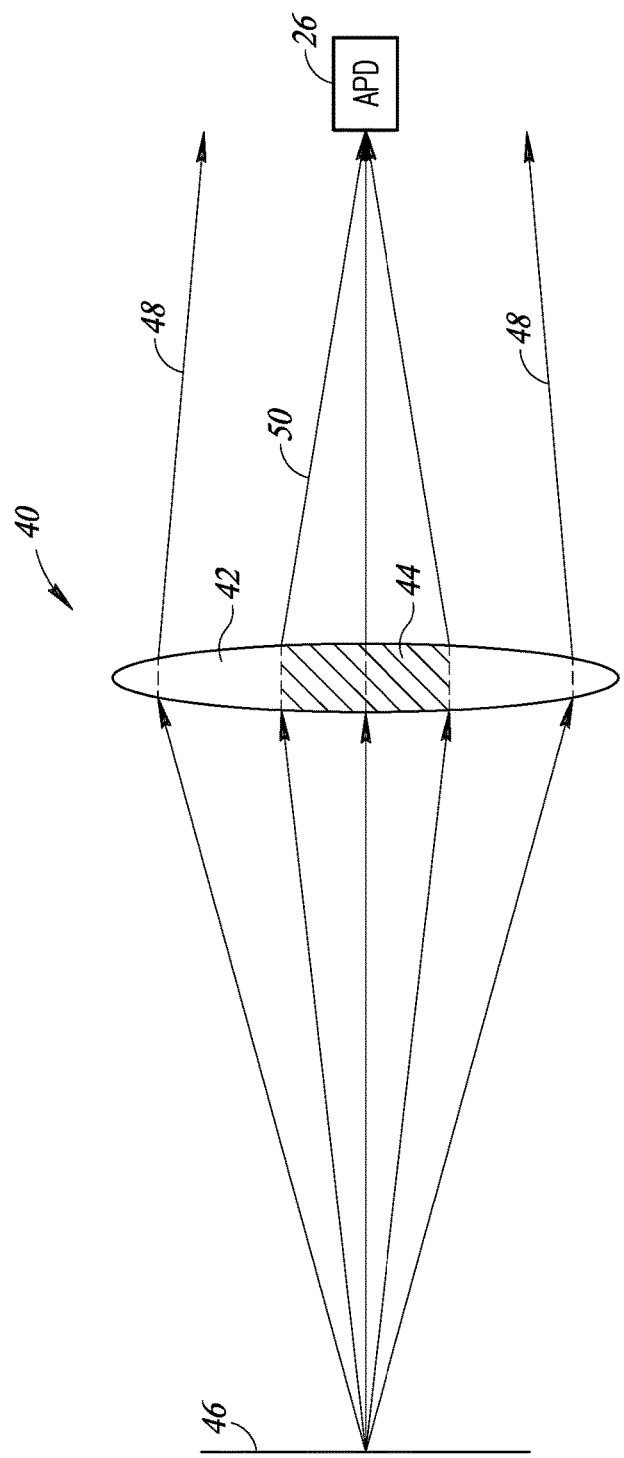
FIG. 2 is a schematic diagram of a sectioned lens for a laser scanner.

The aspheric profile of the collecting mirror 114 compresses a signal power function to extend the detection range of a laser scanner to relatively short distances and to block backscattered light from the protection window 128 of the laser scanner 100. In contrast to a sectioned lens (FIG. 2), the aspheric profile of the collecting mirror 114 may have a smooth profile with no curvature discontinuity, for example. The particular profile of the collecting reflector may be designed to cover the blind zone while providing a smooth plot of signal power as a function of distance.

Figure 8:
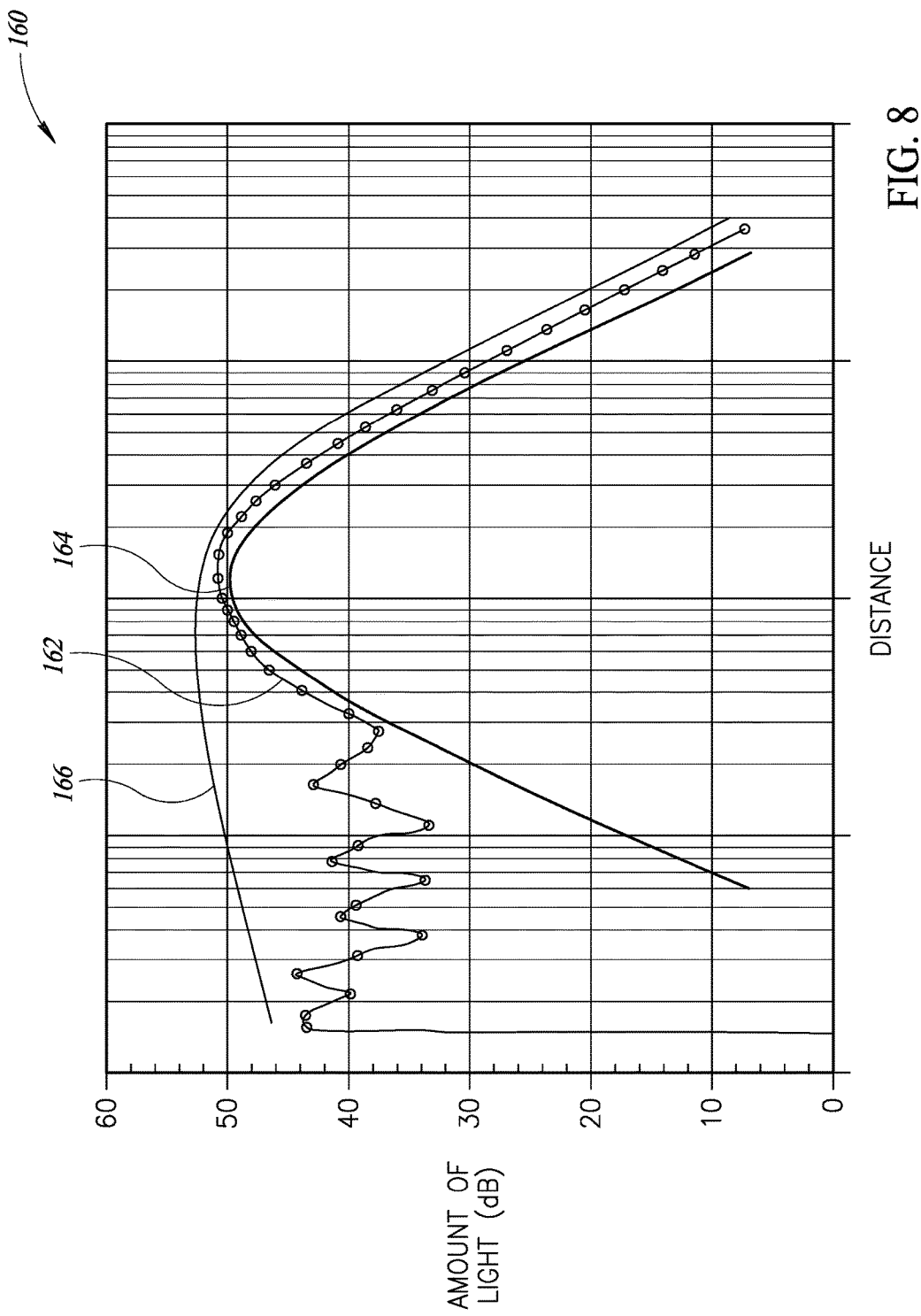
FIG. 8 is a graphical plot of signal power as a function of distance for a sectioned lens, a parabolic reflector and an aspheric reflector, according to one illustrated implementation.

FIG. 8 shows an example graphical plot 160 of signal power as a function of distance for a sectioned lens 162, a parabolic reflector 164 and an aspheric reflector 166. As can be seen from the plot, the signal power for a parabolic reflector 164 (i.e., collecting optics without near field coverage correction) drops significantly at short distances due to the blind zone discussed above. In the case of a sectioned lens 162 (see FIG. 2), the signal power shows an undesirable ripple in the near field due to the discontinuity in the lens profile. Conversely, the signal power for the aspheric reflector 166 is continuous without the ripple and maintains a relatively high signal power at short distances.

A non-limiting example equation for the surface profile of the collecting reflector 114 is a third degree polynomial defined by:

$$z = (-5.888 \times 10^{-3}) \times r + (8.987 \times 10^{-3}) \times r^2 + (2.901 \times 10^{-6}) \times r^3$$

The $r^2$ term defines a parabola with its focusing properties. The r term and the $r^3$ term introduce a deviation which produces a more flat power function, as shown in FIG. 8. Although a third degree polynomial is shown above as an example, depending on the system geometry for a particular application it may be desirable to define the surface profile of the collecting reflector with a polynomial of a higher degree (e.g., $4^{th}$ degree, $6^{th}$ degree).

FIGS. 9A-9D show additional arrangements for the transmission path of a laser beam in a laser scanner, such as the laser scanner 100 of FIGS. 4A-4B discussed above, which may be used to provide a more compact design and/or to provide other benefits (e.g., beam alignment).

Figure 9A:
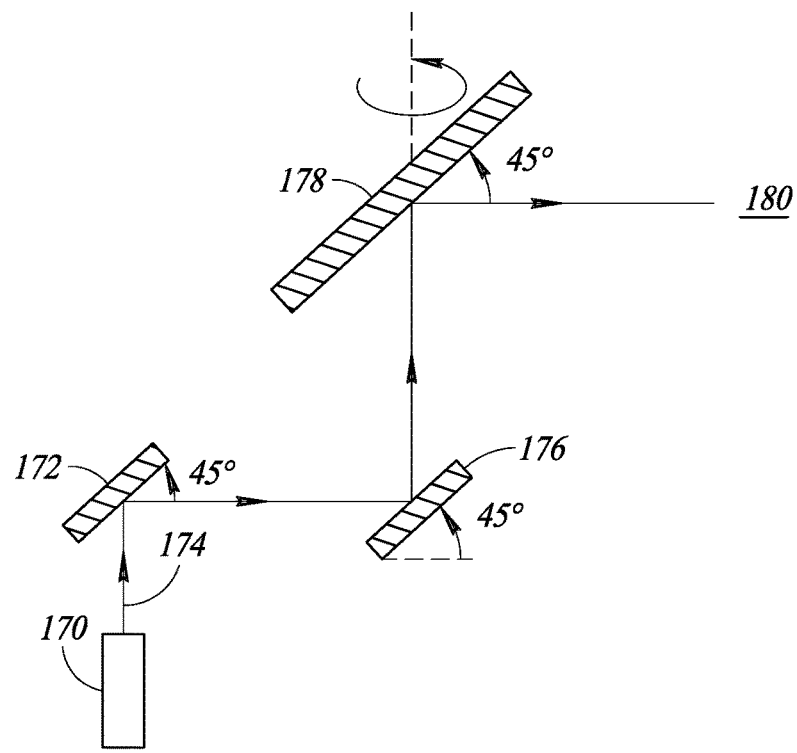
FIG. 9A is a schematic sectional view of a transmission subsystem of a laser scanner which includes a laser source aimed vertically upwards and two folding mirrors, according to one illustrated implementation.

In FIG. 9A, a laser source 170 is aimed vertically upward (as shown) toward a first bending mirror 172 which is tilted upward (from left to right) at a 45 degree angle. The first bending mirror 172 reflects a laser beam 174 emitted by the laser source 170 horizontally (as shown) at a right angle toward a second bending mirror 176 tilted upward at a 45 degree angle. The second bending mirror 176 reflects the laser beam 174 vertically upward at a right angle toward a rotating scanning mirror 178, which reflects the laser beam 174 horizontally toward a scanning area 180.

Figure 9B:
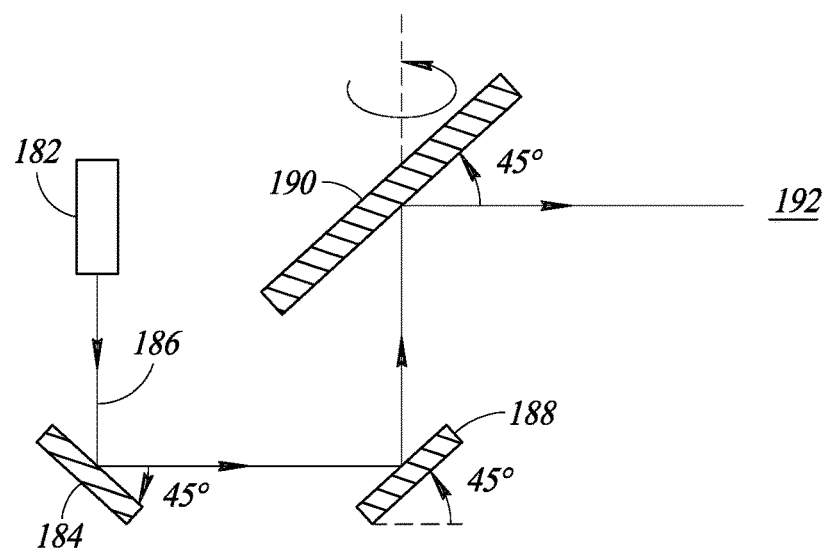
FIG. 9B is a schematic sectional view of a transmission subsystem of a laser scanner which includes a laser source aimed vertically downward and two folding mirrors, according to one illustrated implementation.

In FIG. 9B, a laser source 182 is aimed vertically downward toward a first bending mirror 184 which is tilted downward (from left to right) at a 45 degree angle. The first bending mirror reflects a laser beam 186 emitted by the laser source 182 horizontally (as shown) at a right angle toward a second bending mirror 188 tilted upward at a 45 degree angle. The second bending mirror 188 reflects the laser beam 186 vertically upward at a right angle toward a rotating scanning mirror 190, which reflects the laser beam horizontally toward a scanning area 192.

By utilizing two bending mirrors as shown in FIGS. 9A and 9B, the laser source of a laser scanner may be aimed in a vertical direction which in some applications may allow for a more compact design and/or may provide desirable beam alignment advantages.

Figure 9C:
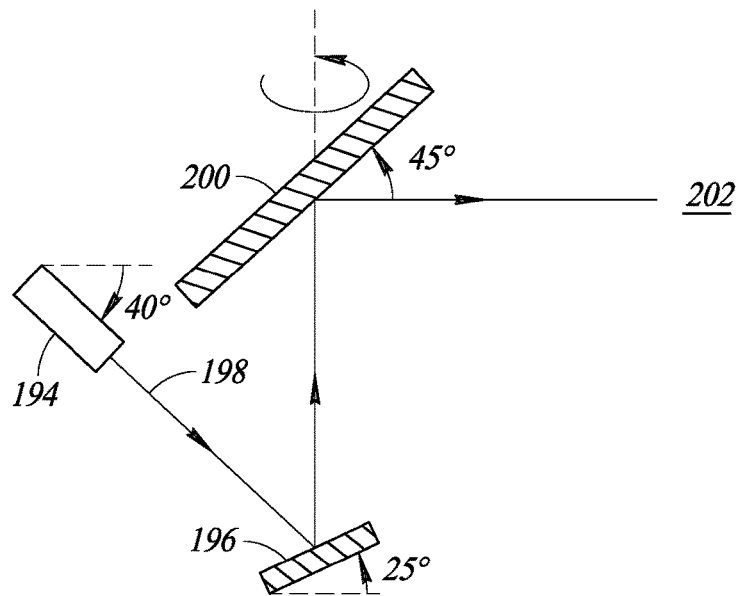
FIG. 9C is a schematic sectional view of a transmission subsystem of a laser scanner which includes a folding mirror tilted at an angle different from 45 degrees, according to one illustrated implementation.

In FIG. 9C, a laser source 194 is aimed downward at an angle of approximately 40 degrees from horizontal toward a bending mirror 196 which is tilted upward at an angle of approximately 25 degrees. The bending mirror 196 reflects a laser beam 198 emitted by the laser source 194 vertically upward toward a rotating scanning mirror 200, which reflects the laser beam 198 horizontally toward a scanning area 202.

Figure 9D:
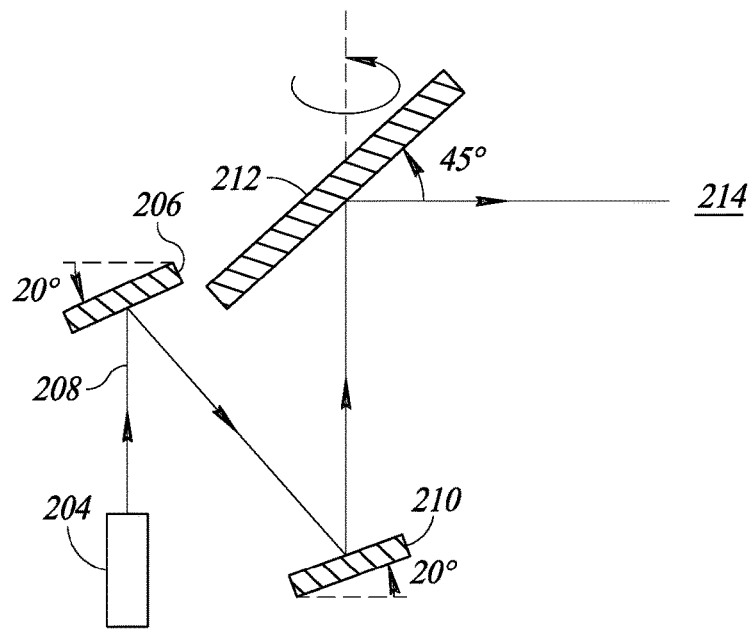
FIG. 9D is a schematic sectional view of a transmission subsystem of a laser scanner which includes two folding mirrors each tilted at angles different from 45 degrees, according to one illustrated implementation.

In FIG. 9D, a laser source 204 is aimed vertically upward toward a first bending mirror 206 which is tilted upward at an angle of approximately 20 degrees. The first bending mirror 206 reflects a laser beam 208 emitted by the laser source 204 downward toward a second bending mirror 210 tilted upward at an angle of approximately 20 degrees. The second bending mirror 210 reflects the laser beam 208 vertically upward toward a rotating scanning mirror 212, which reflects the laser beam 208 horizontally toward a scanning area 214.

As shown in FIGS. 9C and 9D, the tilt angle of the bending mirrors may be other than 45 degrees (e.g., 15 degrees, 30 degrees, 60 degrees) and in instances where more than one bending mirror (e.g., two, three) is used, the optical path may be more compact that instances where one or more bending mirrors are each tilted at 45 degrees.

The collecting mirror profiles discussed above achieve the goal of compressing the dynamic extension of the signal throughout the measurement range and covering short distances when the central obstruction of the bending mirror is generally less than ¼ of the full diameter of the entrance pupil diameter (EPD) of the receiving optics. When the range extends further (e.g., 7-8 meters) and the central obstruction is larger, it may not be possible to match the efficiency at such a long range while providing coverage at the short range (e.g., a few centimeters). For instance, it has been found that when the central obstruction approaches ⅓ of the entrance pupil diameter (EPD), it may be desirable or necessary to focus most or all of the entrance beam which is captured by the scanning mirror and not obstructed by the central obstruction on the sensitive area of the detector to obtain the maximum efficiency.

Figures 10A, 10B:
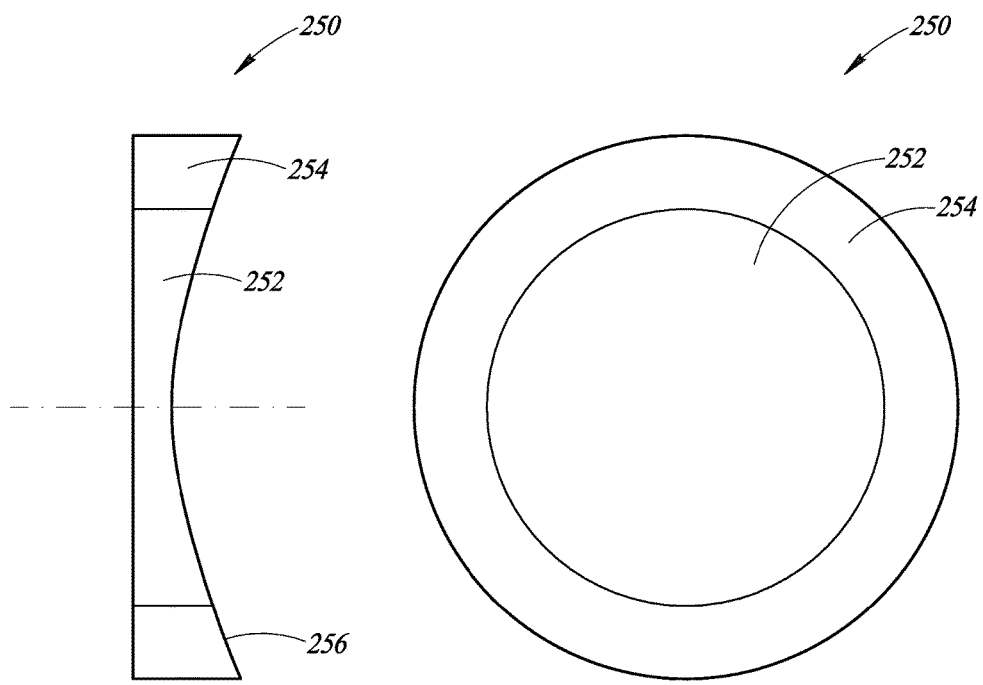
FIG. 10A is an elevational view of a compound collecting mirror, according to one illustrated implementation.
FIG. 10B is a top plan view of the compound collecting mirror of FIG. 10A, according to one illustrated implementation.

FIGS. 10A and 10B show an implementation of a compound collection mirror 250 which includes two concentric areas comprising an inner mirror 252 having a top surface 253 which is used to focus incoming light to detect long range objects and an outer ring mirror 254 which is used to focus incoming light to detect short range objects. The top surface 253 of the inner mirror 252 may have a parabolic profile, an elliptical profile or other suitable profile (e.g., aspheric). For example, the top surface 253 of the inner mirror 252 may have a profile of an elongated ellipse, with a first (near) focus at the detector and a second (far) focus at a maximum ranging distance (e.g., 5 meters, 10 meters). A top surface 256 of the outer ring mirror 254 may have a curvature which is tailored to cover the short range with a substantially constant efficiency in the short distance and a rapid drop in efficiency for objects which are very near the protective window of the scanner and for light reflected from the protective window itself.

Figure 11:
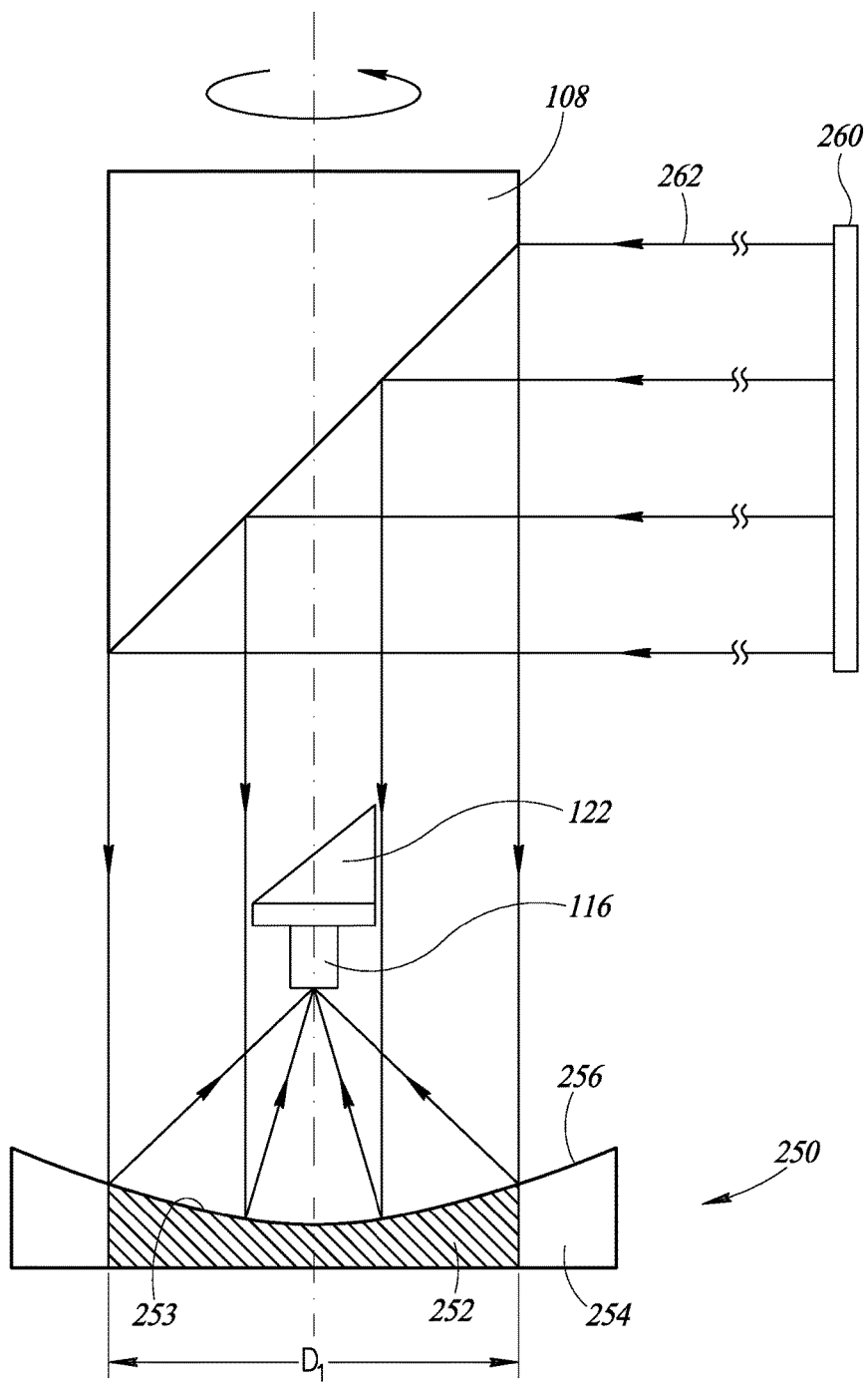
FIG. 11 is a schematic sectional view of a reception subsystem of a laser scanner which includes a compound collecting mirror, showing light returned from a distant object, according to one illustrated implementation.

As shown in FIG. 11, when an object 260 is far away (e.g., 5-8 meters) from the scanner, reflected rays 262 are substantially parallel and the diameter ($D_1$) of the illuminated area on the collecting mirror 250 is the same as or just slightly larger than the EPD determined by the dimensions of the scanning mirror 108.

Figure 12:
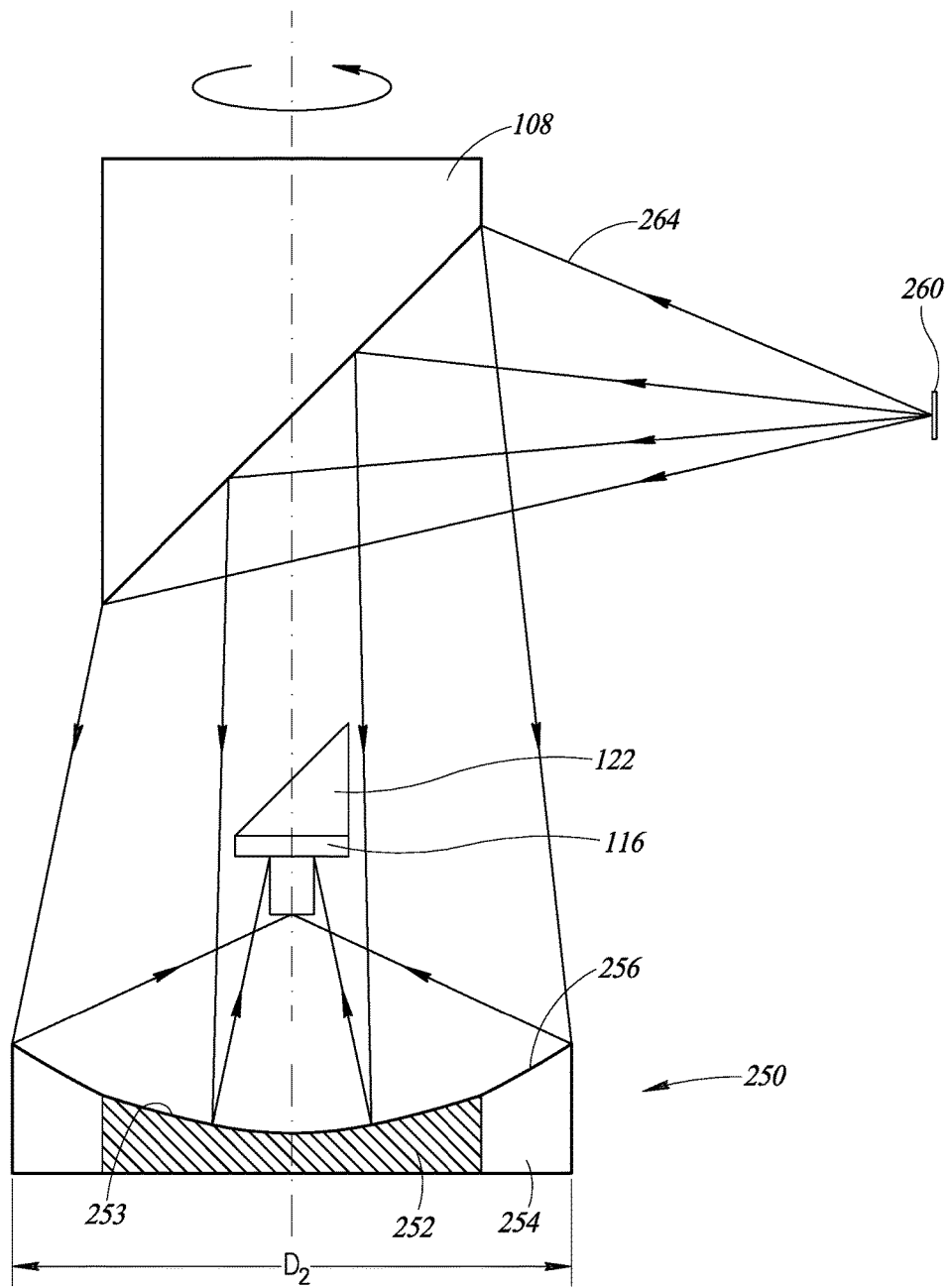
FIG. 12 is a schematic sectional view of a reception subsystem of a laser scanner which includes a compound collecting mirror, showing light returned from a near object, according to one illustrated implementation.

When the object 260 gets closer, as shown in FIG. 12, a reflected beam 264 becomes diverging from the spot projection on the target plane and the illuminated area of the collecting mirror surfaces has a diameter ($D_2$) which extends to the outer ring mirror 254. As the distance of the object 260 is reduced relative to the scanner, a larger area is illuminated by the incoming radiation. If the focal distance associated with the ring mirror 254 is shorter than the focal distance of the inner or central mirror 252, the detector 116 can see objects which are close to the scanner. As discussed below, a tailored design procedure can set a cut off distance so that a reflective signal from the protective window surface is nulled or minimized to cause little or no disturbance to the detection of objects in the scanning field.

Further, it may be desirable to compress the dynamic range of the detection signal as much as possible. Generally, the receiving optics should be designed to have the maximum efficiency at long distances, limited peak of efficiency in the intermediate range, and provide signal coverage at very short distances (e.g., a few centimeters).

Figure 13:
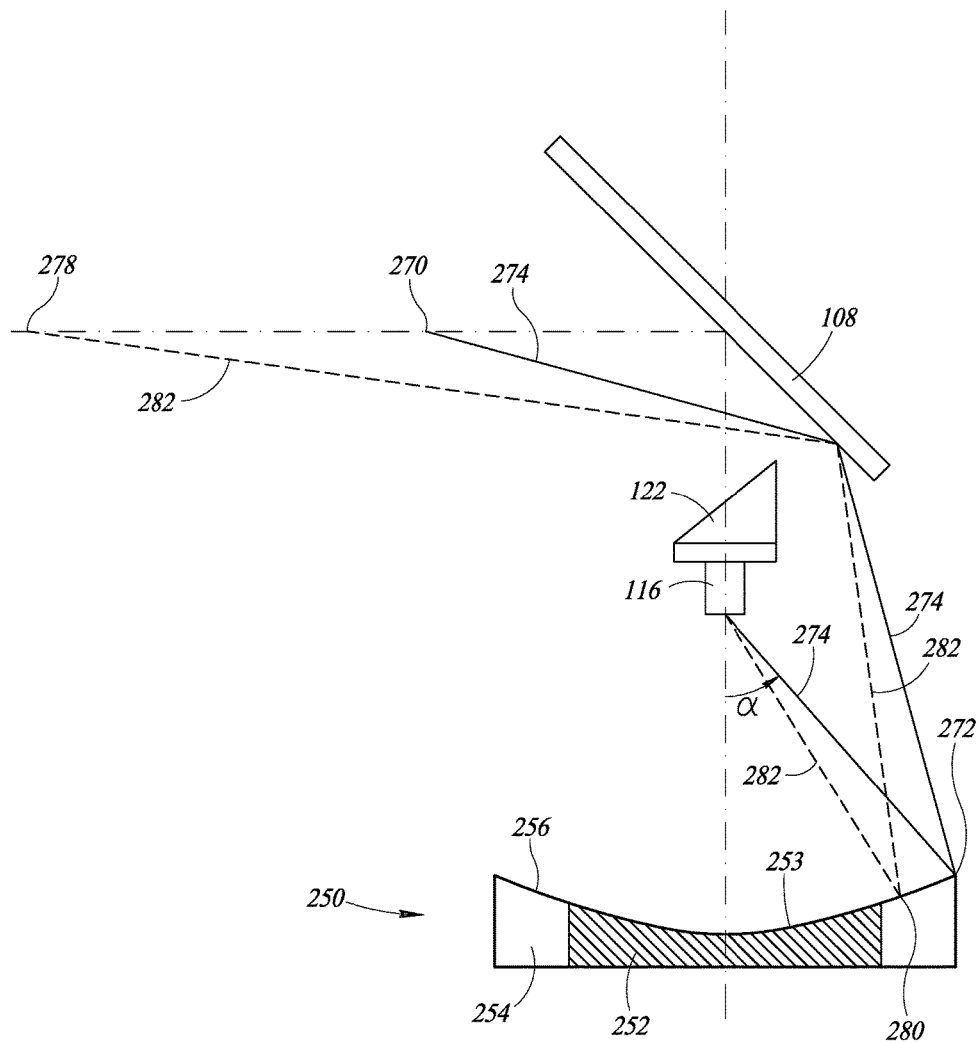
FIG. 13 is a schematic sectional view of a reception subsystem of a laser scanner which includes a compound collecting mirror, showing a tailored profile of an outer ring mirror of the compound collecting mirror which covers a short range by associating each point on the outer ring mirror to a determined object distance, according to one illustrated implementation.

As shown in FIG. 13, when an object is close to the scanner, the outer area of the collecting mirror 250 is illuminated by the reflected radiation and it is possible to deflect rays toward the detector 116 by increasing the slope of the top surface 256 of the ring mirror 254. It is noted that the top surface 253 of the central mirror 252 may be parabolic or elliptical to maintain maximum efficiency for long ranges (e.g., 2 or more meters). Thus, the outer ring mirror 254 may work in the medium and short ranges only (e.g., 0-2 meters).

As shown in FIG. 13, reflected light 274 from an object at a relatively close distance 270 (e.g., a few centimeters) hits the top surface 256 of the ring mirror 252 at an outer edge 272 thereof due to the larger diameter of the reflected light. Reflected light 282 from an object at a relatively further distance (e.g., 1-2 meters) hits the top surface 256 of the ring mirror 252 at a point 280 inward of the outer edge 272 of the ring mirror 252 due to the relatively smaller diameter of the reflected light. As noted above, reflected light from an object at a relatively long range (e.g., greater than 2 meters) hits only the central mirror 252 due to the relatively smaller diameter (e.g., diameter $D_1$ of FIG. 11) of the reflected light. It is noted that the rays 274 and 282 are shown as hitting the scanning mirror 108 at the same location by chance, but in practice it is not necessary that the two optical paths share a common point.

Thus, as an object gets closer to the scanner, a gradually larger diameter of the collecting mirror 250 is hit by the reflected light. In some implementations, the profile for the top surface 256 of the ring mirror 256 may be calculated using a process known in technical literature on non-imaging optics to match incoming rays angles with reflected rays so that the rays can hit the detector 116. See, for example, W. Elmer, *The Optical Design of Reflectors*, Wiley, 1980, and J. Chaves, *Introduction to Nonimaging optics*, CRC Press, 2008. In some implementations, the profile for the top surface 256 of the ring mirror 254 may be calculated at discrete points that match incident and reflected ray angles, and then transformed into a smooth profile via interpolation with a polynomial (e.g., $3^{rd}$ degree polynomial, $4^{th}$ degree polynomial, etc.). As another example, the profile of the top surface 256 of the outer ring mirror 254 may be described by a Zernike polynomial, a Chebyshev polynomial, or other suitable expression.

Figure 14:
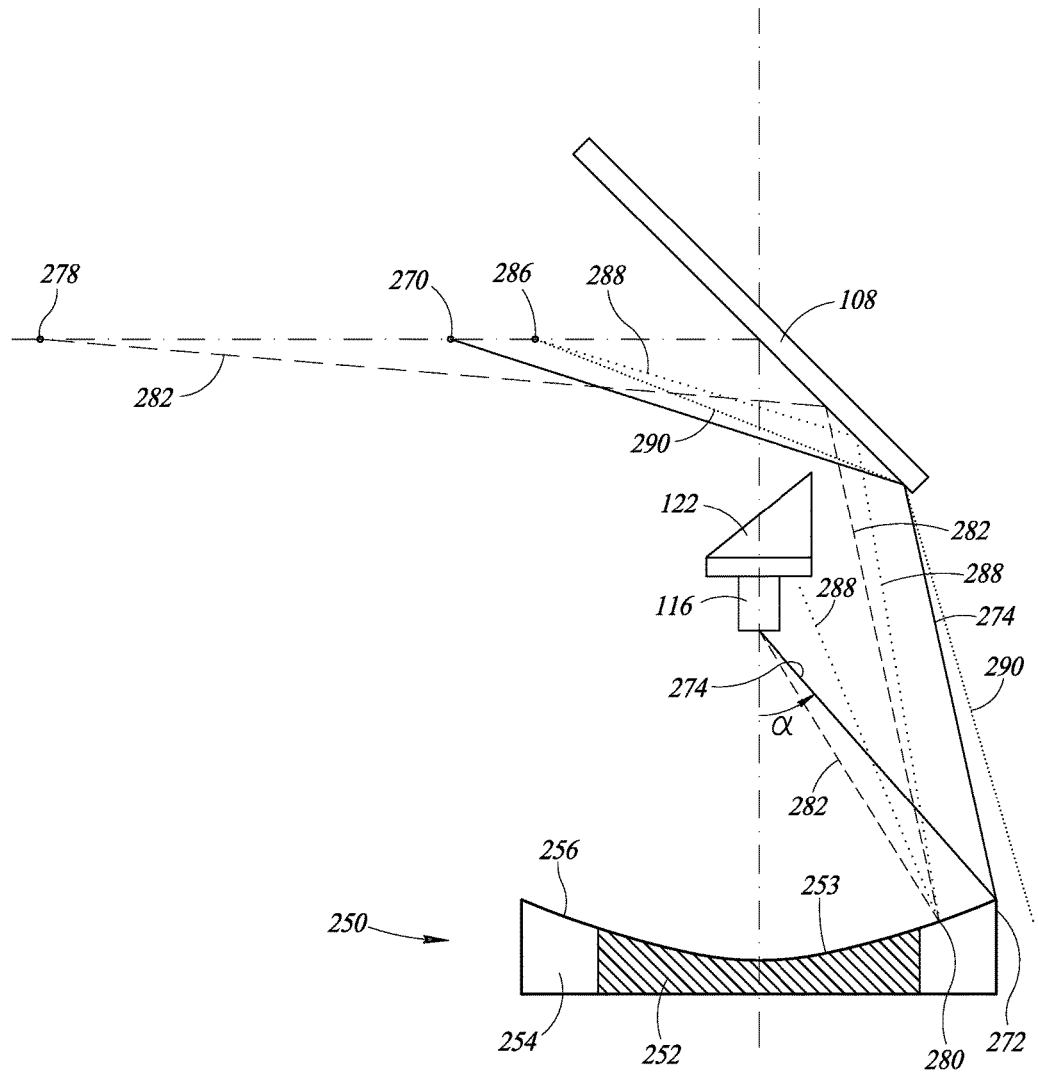
FIG. 14 is a schematic sectional view of a reception subsystem of a laser scanner which includes a compound collecting mirror, showing a detailed view of a cut-off range for objects which are very close to a protective window of the laser scanner, according to one illustrated implementation.

FIG. 14 shows a detailed view of a cut-off range for objects that are very close to the protective window of the scanner. As discussed above with reference to FIG. 13, rays 274 coming from an object at the distance 270 hit the outer edge 272 of the ring mirror 254 and are focused on the detector 116. Rays 282 coming from an object at the distance 278 hit the point 282 inward of the outer edge 272 and are focused on the detector 116. Rays 288 and 290 coming from an object at a very close distance 286 either miss the collecting mirror 250 altogether (ray 290) or are reflected by the ring mirror 254 but miss the detector 116 (ray 288). Thus, the scanner will not detect objects which are very close to the protective window of the scanner, including the protective window itself.

Utilizing this design, it is possible to move the "knee" of the signal power function where the signal power changes its shape from nearly flat to the inverse square law. As can be seen in FIG. 14, the edge ray 274 that hits the ring mirror 254 at the shortest distance 270 in the cut-off range still hits the detector 116, but rays 288 and 290 which are reflected from an object at the shorter distance 286 will miss the detector 116 and/or the collecting mirror 250.

The tuning of this geometry allows the designer to set the cut-off distance and, due to a large angle α (see FIG. 13), the transition from a high signal to a very low or no signal may be reduced to a span of a few centimeters. The precise positioning of the cut-off distance may be tuned in a calibration stage of the manufacturing process so that the scanner receives a faint signal from light reflected by the protective window but a strong enough signal from an object just a few centimeters outside the protective window.

Figure 15:
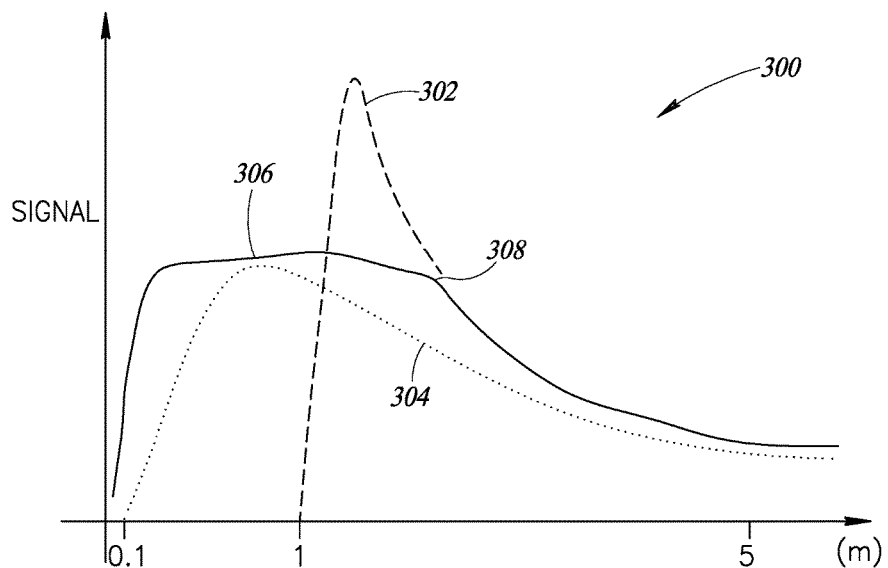
FIG. 15 is a graphical plot of signal power as a function of distance for a parabolic reflector, an aspheric reflector, and a compound reflector, according to one illustrated implementation.

FIG. 15 shows a plot 300 of signal power as a function of object distance for a parabolic mirror 302, an aspheric mirror 304 (e.g., mirror 114), and a compound mirror 306 (e.g., compound mirror 250). As shown, the compound mirror 306 has a relatively flat profile which drops off sharply at a "knee" 308. Thus, the compound mirror 306 covers a blind zone at short distances while cutting off signals from the protective window or signals from objects very near the protective window.

Figure 16:
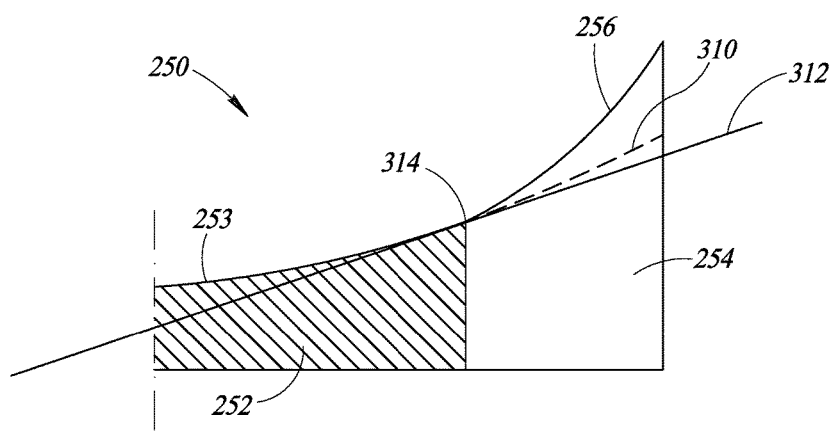
FIG. 16 is a schematic sectional view of a compound collecting mirror which comprises a central mirror and an outer ring mirror, showing a continuous curvature between an outer edge of the central mirror and an inner edge of the outer ring mirror, according to one illustrated implementation.

FIG. 16 shows a detailed view of the curvature profile for the top surface 253 of the inner mirror 252 and the top surface 256 of the outer ring mirror 254 of the compound mirror 250. A theoretical parabolic surface 310 is shown below the top surface 256 for reference to show the greater curvature of the top surface 256 compared to a parabolic surface. The curvatures shown in FIG. 16 are exaggerated for the purpose of illustration. At a point 314 wherein the top surface 253 of the inner mirror 252 joins the top surface 256 of the outer ring mirror 254, a tangent line 312 of the surface 253 and the surface 256 may be constrained to be the same. Such feature avoids a sudden deviation in the direction of rays that would otherwise cause a discontinuity in the signal power function at the point 314.

The implementations disclosed herein provide laser scanners which are compact, cost effective, less prone to molding tolerances, have higher optical efficiency, and provide a clear separation between the emission subsystem (e.g., upper part of the housing 122 above the interference filter 120) and the receiving or reception subsystem (e.g., lower part of the housing below the interference filter).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A laser scanner to detect objects in a scanning area, the laser scanner comprising:
   a transmission subsystem and a reception subsystem, the transmission subsystem including:
      a light source which in operation emits a light beam; and
      a scanning mirror rotatable about an axis of rotation which reflects the light beam from the light source toward the scanning area and which directs return light from objects in the scanning area toward the reception subsystem;
   the reception subsystem, including:
      a collecting mirror dimensioned and positioned to receive the return light from the scanning mirror, the collecting mirror having a reflective surface which has an aspheric profile;
      an interference filter disposed between the collecting mirror and the scanning mirror, in operation the interference filter filters the return light from the scanning mirror and provides the filtered return light to the collecting mirror; and
      a light detector disposed between the interference filter and the collecting mirror, in operation the light detector receives the filtered return light reflected from the collecting mirror.

2. The laser scanner of claim 1 wherein the collecting mirror has a reflective surface which is defined at least in part by an N degree polynomial, where N is an integer greater than or equal to three.

3. The laser scanner of claim 1 wherein the collecting mirror has a reflective surface which is defined at least in part by a Zernike polynomial or a Chebyshev polynomial.

4. The laser scanner of claim 1 wherein the collecting mirror has a reflective surface which has a continuous curvature.

5. The laser scanner of claim 1 wherein the collecting mirror has a reflective surface which comprises at least one layer of a reflective coating disposed over a plastic material.

6. The laser scanner of claim 5 wherein the reflective coating of the collecting mirror comprises at least one of an aluminum coating, a silver coating, or a gold coating, and the plastic material comprises at least one of polycarbonate (PC), polymethylmethacrylate (PMMA), or cyclic olefin polymer (COP).

7. The laser scanner of claim 5 wherein the plastic material is absorptive to the light beam emitted by the light source.

8. The laser scanner of claim 1 wherein the light source comprises a laser diode, and the light detector comprises an avalanche photodiode.

9. The laser scanner of claim 1 wherein the interference filter comprises a bandpass filter which filters light having wavelengths which are outside a spectrum of the light beam emitted by the light source.

10. The laser scanner of claim 1 wherein the interference filter comprises a colored glass substrate.

11. The laser scanner of claim 1, further comprising:
   a first folding mirror disposed in an optical path between the light source and the scanning mirror.

12. The laser scanner of claim 11 wherein the first folding mirror has a reflective surface which is parallel with a reflective surface of the scanning mirror.

13. The laser scanner of claim 11 wherein the first folding mirror has a reflective surface which is non-parallel with a reflective surface of the scanning mirror.

14. The laser scanner of claim 11 wherein the first folding mirror reflects the light beam at an angle of reflection other than 45 degrees with respect to normal.

15. The laser scanner of claim 11, further comprising:
   a second folding mirror disposed in the optical path between the light source and the first folding mirror.

16. The laser scanner of claim 15 wherein the first folding mirror and the second folding mirror have respective reflective surfaces which are parallel to each other.

17. The laser scanner of claim 15 wherein at least one of the first folding mirror and the second folding mirror has a reflective surface which is non-parallel with a reflective surface of the scanning mirror.

18. The laser scanner of claim 15 wherein at least one of the first folding mirror and the second folding mirror reflect the light beam at an angle of reflection other than 45 degrees with respect to normal.

19. A laser scanner to detect objects in a scanning area, the laser scanner comprising:
   a transmission subsystem and a reception subsystem, the transmission subsystem including:
      a light source which in operation emits a light beam; and
      a scanning mirror rotatable about an axis of rotation which reflects the light beam from the light source toward the scanning area and which directs return light from objects in the scanning area toward the reception subsystem;
   the reception subsystem, including:
      a collecting mirror dimensioned and positioned to receive the return light from the scanning mirror, the collecting mirror comprises a compound mirror comprising a central mirror which has a reflective surface which has a parabolic profile or an elliptical profile, and an outer ring mirror which surrounds the central mirror, the outer ring mirror having a reflective surface which has an aspheric profile;
      an interference filter disposed between the collecting mirror and the scanning mirror, in operation the interference filter filters the return light from the scanning mirror and provides the filtered return light to the collecting mirror; and a light detector disposed between the interference filter and the collecting mirror, in operation the light detector receives the filtered return light reflected from the collecting mirror.

20. The laser scanner of claim 19 wherein an outer edge of the reflective surface of the central mirror has a first tangent value, and an inner edge of the of the reflective surface of the outer ring mirror has a second tangent value, the second tangent value equal to the first tangent value to provide continuous curvature between the reflective surface of the central mirror and the reflective surface of the outer ring mirror.

21. The laser scanner of claim 19 wherein the reflective surface of the outer ring mirror is defined at least in part by an N degree polynomial, where N is an integer greater than or equal to three.

22. The laser scanner of claim 19 wherein the reflective surface of the outer ring mirror is defined at least in part by a Zernike polynomial or a Chebyshev polynomial.

23. A method of operating a laser scanner to detect objects in a scanning area, the method comprising:
   emitting, by a light source, a light beam;
   reflecting, by a scanning mirror rotatable about an axis of rotation, the light beam emitted by the light source toward the scanning area;
   reflecting, by the scanning mirror, return light reflected from objects in the scanning area toward an interference filter;
   filtering, by the interference filter, the return light from the scanning mirror to provide filtered return light;
   reflecting, by a collecting mirror having a reflective surface having an aspheric profile, the filtered return light toward a light detector; and
   detecting, by the light detector, the filtered return light reflected from the collecting mirror.

24. The method of claim 23 wherein reflecting, by a collecting mirror, the filtered return light toward a light detector comprises reflecting by a collecting mirror which has a reflective surface defined at least in part by a Zernike polynomial, a Chebyshev polynomial, or an N degree polynomial, where N is an integer greater than or equal to three.

25. The method of claim 23, further comprising:
   folding, by a first folding mirror disposed in an optical path between the light source and the scanning mirror, the light beam between the light source and the scanning mirror.

26. The method of claim 25 wherein folding the light beam between the light source and the scanning mirror comprises folding the light beam by a first folding mirror which has a reflective surface which is parallel with a reflective surface of the scanning mirror.

27. The method of claim 25 wherein folding the light beam between the light source and the scanning mirror comprises folding the light beam by a first folding mirror which has a reflective surface which is non-parallel with a reflective surface of the scanning mirror.

28. The method of claim 25 wherein folding the light beam between the light source and the scanning mirror comprises folding the light beam by the first folding mirror by an angle of reflection which is less than 45 degrees.

29. The method of claim 25, further comprising:
   folding, by a second folding mirror disposed in the optical path between the light source and the first folding mirror, the light beam between the light source and the first folding mirror.

30. The method of claim 29 wherein folding the light beam between the light source and the scanning mirror by the first folding mirror and the second folding mirror comprises at least one of: folding the light beam by the first folding mirror by an angle of reflection which is less than 45 degrees, and folding the light beam by the second folding mirror by an angle of reflection which is less than 45 degrees.

31. The method of claim 29 wherein folding the light beam between the light source and the scanning mirror by the first folding mirror and the second folding mirror comprises folding the light beam by the first folding mirror by an angle of reflection which is less than 45 degrees and folding the light beam by the second folding mirror by an angle of reflection which is less than 45 degrees.

32. A method of operating a laser scanner to detect objects in a scanning area, the method comprising:
   emitting, by a light source, a light beam;
   reflecting, by a scanning mirror rotatable about an axis of rotation, the light beam emitted by the light source toward the scanning area;
   reflecting, by the scanning mirror, return light reflected from objects in the scanning area toward an interference filter;
   filtering, by the interference filter, the return light from the scanning mirror to provide filtered return light;
   reflecting, by a collecting mirror, the filtered return light toward a light detector, wherein reflecting comprises reflecting by a collecting mirror which comprises a compound mirror including a central mirror which has a reflective surface which has a parabolic profile or an elliptical profile, and an outer ring mirror which surrounds the central mirror, the outer ring mirror having a reflective surface which has an aspheric profile; and
   detecting, by the light detector, the filtered return light reflected from the collecting mirror.

33. The method of claim 32 wherein reflecting, by a collecting mirror, the filtered return light toward a light detector comprises reflecting by the compound mirror, and an outer edge of the reflective surface of the central mirror has a first tangent value, and an inner edge of the of the reflective surface of the outer ring mirror has a second tangent value, the second tangent value equal to the first tangent value to provide continuous curvature between the reflective surface of the central mirror and the reflective surface of the outer ring mirror.

34. The method of claim 32 wherein reflecting, by a collecting mirror, the filtered return light toward a light detector comprises reflecting by the compound mirror, and the reflective surface of the outer ring mirror is defined at least in part by an N degree polynomial, where N is an integer greater than or equal to three.

35. The method of claim 32 wherein reflecting, by a collecting mirror, the filtered return light toward a light detector comprises reflecting by the compound mirror, and the reflective surface of the outer ring mirror is defined at least in part by a Zernike polynomial or a Chebyshev polynomial.

36. An optical system for a laser scanner which detects objects in a scanning area, the optical system comprising:
   a light source which in operation emits a laser beam;
   a scanning mirror rotatable about an axis of rotation which reflects the laser beam from the light source toward the scanning area and which reflects return light from objects in the scanning area;
   a collecting mirror dimensioned and positioned to receive the return light from the scanning mirror, the collecting mirror having a reflective surface which is defined at least in part by an N degree polynomial, where N is an integer greater than or equal to three;
an interference filter disposed between the collecting mirror and the scanning mirror; and
a light detector disposed between the interference filter and the collecting mirror.

* * * * *